SQUARE ROOT OUTPUT CIRCUIT UTILIZING A VOLTAGE SENSITIVE CAPACITIVE DIODE
Filed Jan. 21, 1965
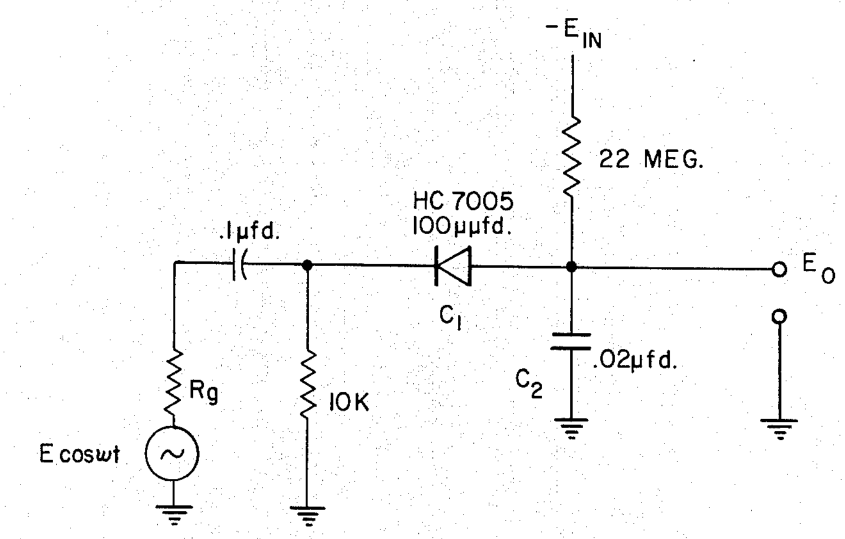
INVENTORS
MARK G. LOWENSTEIN
JOHN R. KRUSE, JR.
BY
Robert Ames Norton
ATTORNEY United States Patent Office 3,231,766

Patented Jan. 25, 1966

3,231,766

SQUARE ROOT OUTPUT CIRCUIT UTILIZING A VOLTAGE SENSITIVE CAPACITIVE DIODE

Mark G. Lowenstein, Norwalk, and John R. Kruse, Jr., Weston, Conn., assignors to Barnes Engineering Company, Stamford, Conn., a corporation of Delaware Filed Jan. 21, 1965, Ser. No. 428,611
4 Claims. (Cl. 307—88.5)

This invention relates to an improved circuit for producing an alternating current output approximating the square root of an input signal, and is in part a continuation of our copending application Serial No. 272,972, filed April 15, 1963, and now abandoned.

There are known some complex circuits using elements such as vacuum tubes operating under certain specific conditions, and with particular tube geometry, or circuits with numerous and complicated stages, which are capable of producing an output which approximates the square root of the input. Because of the great complexity, cost and sensitiveness of these circuits, they have not achieved very extensive practical success, particularly in instruments which must be used in the field and where the environment cannot be as closely controlled as in certain laboratory research instruments.

The present invention relates to a simple, rugged and cheap circuit using commercially available components which will give an output approximately proportional to the square root of the input signal.

Essentially the present invention utilizes two capacitors, one of which is a particular type of voltage-sensitive capacitor, namely, a diode, and the other is a normal capacitor. The latter has a capacity very much larger than the voltage-sensitive capacitor.

The voltage-sensitive capacitor used in the present invention is a diode of semiconductor material having an abrupt P–N junction and biased with a reverse bias voltage less than the breakdown or avalanche voltage. With an abrupt junction there is a zone on either side of the junction where the normal carriers are few in number; this is usually referred to as a "depletion zone." The width of the zone depends on the voltage applied to the capacitor. When a reverse bias is used, the diode behaves as a capacitor because the P-layer and N-layer have good conductivity and are separated by this depletion layer of poor conductivity, thus behaving in a manner similar to a dielectric. The depletion zone changes in width depending on the amount of reverse bias voltage. Thus the application of the voltage results in changing the capacity of the capacitor. Typical diode capacitors are those sold by the Hughes Semiconductor Company under their HC7000 series, or the capacitors sold by the Philco Corporation under their names of "Voltacaps." The present invention is not limited to the two series of capacitors referred to, but is very definitely limited to the type of capacitor, namely a reverse biased diode having an abrupt junction. Theoretically, if the junction were completely abrupt, that is to say no carriers of any kind in the depletion layer, the circuit of the present invention would produce an output exactly equal to the square root of the voltage input. However, this is an ideal which is only approached in practical voltage-sensitive capacitors of the reverse biased diode type, and in practical circuits the output voltage will vary from the 0.46 to 0.49 power.

The present invention should not be confused with circuits in which other and different types of voltage-sensitive capacitors and normal capacitors are used. Such other circuits may, for example, be amplifiers, the capacitors being in series and the output of the circuit being developed across the voltage-sensitive capacitor. Such a circuit, for example, is shown in the article by Jenkins in the December 1954 volume of "Electrical Manufacturing," page 93. In the present invention, using reverse bias diode capacitors with ordinary capacitors, the voltage output is not amplified, but on the contrary is the square root of the voltage input, or a close approximation thereto.

It is an advantage of the present invention that the square root circuit is effective over a wide range of frequencies without significant change in the output function. Thus, for example, there is a practically perfectly uniform output function for frequencies from 500 c.p.s. to 50 kc. and more.

It is essential to the present invention that the voltage-sensitive capacitor have very much smaller capacity than the ordinary capacitor. In a typical circuit the ratio may be as much as 1000:1. While theoretically it would be possible to develop the output across the voltage-sensitive capacitor as is shown in the amplifying circuit of the Jenkins article above referred to, for most purposes it is greatly preferable to develop the output signal across the much larger ordinary capacitor, and this is the preferred form of the present invention.

In the circuit of the present invention there must be a source of alternating current signal which is fed in series through two capacitors. The input signal is fed into the junction, providing for suitable constant reverse bias of the proper value, and the output is developed across one or other of the two capacitors, the ordinary capacitor in the case of the preferred embodiment. It should be noted that the input signal, or a separate source, must provide the proper D.C. bias for the correct operating point of the voltage-sensitive capacitor, the incoming A.C. signal being superimposed thereon. The invention will be described in conjunction with the drawing, which illustrates the circuit in schematic form.

At the left of the drawing there is shown a symbol for an alternating current source, such as one producing a sine wave voltage as indicated. The signal voltage labelled $E_{in}$ is introduced through a high resistor to the junction of the voltage sensitive capacitor C1 sold by the Hughes Semiconductor Company under their number HC7005, and a regular capacitor C2. The former has a capacity of 100$\mu\mu$fd. at a reverse voltage of four volts and the latter .02$\mu$fd. The output voltage $E_0$ is proportional to the 0.44–0.46 power of the input voltage. The values of the .1$\mu$fd. capacitor and shunting 10K resistor for the source of alternating current are not critical and are merely for D.C. isolation of the actual circuit of the invention which is composed of the two capacitors C1 and C2 in series.

It will be noted that the circuit produces a reliable, approximate square root output with the use of simple circuit elements. The values are in no sense critical, and it is an advantage of the present invention that the circuit is very stable. The value of the ordinary capacitor C2, while not critical, should be sufficiently great so that no excessive loading of the following circuit results.

The particular reverse bias will vary somewhat with the particular make of abrupt-junction diode capacitor, for example, in the case of the "Voltacaps" of the Philco Corporation, an average D.C. bias of −8 v. is recommended. The exact bias is not critical.

It is common in circuits of the general nature of the present invention to amplify the output and, if desired, to transform it into D.C. by rectification or into a much slower varying output. For this purpose conventional integrating circuits or rectifiers may be used. Since the further processing of the output voltage forms no part of the present invention no additional circuits are shown.

We claim:

1. A circuit for the production of an output signal corresponding in voltage approximately to the square root of an input signal comprising in combination, (a) two capacitors in series, one of them being a voltage sensitive capacitor of the reverse biased, abrupt P-N junction type, and the other an ordinary capacitor, the latter being of very much higher capacitance than the former, (b) a source of alternating current potential having an operating frequency in a predetermined range, said source having an output circuit across which the two capacitors are connected, the output circuit being free from inductances of a magnitude effectively tunable by the voltage sensitive capacitor at the operating frequency of the alternating potential source, (c) means for introducing an input signal and reverse D.C. bias at the junction of the two capacitors, and (d) an output circuit across one capacitor.

2. A circuit according to claim 1 in which the low capacity, voltage sensitive capacitor is the first one in series, and the output is across the much larger ordinary capacitor.

3. A circuit according to claim 2 in which the output circuit of the source of alternating current potential comprises a D.C. isolating high pass filter.

4. A circuit according to claim 1 in which the output circuit of the source of alternating current potential comprises a D.C. isolating high pass filter.

References Cited by the Examiner

UNITED STATES PATENTS

| | | | |
|---|---|---|---|
| 3,023,378 | 2/1962 | Fuller | 307—88.5 |
| 3,119,079 | 1/1964 | Keizer | 307—88.5 |
| 3,154,753 | 10/1964 | Rusy | 307—88.5 |

ARTHUR GAUSS, *Primary Examiner.*

JOHN W. HUCKERT, *Examiner.*